United States Patent [19]
Katsuno et al.

[11] Patent Number: 5,684,603
[45] Date of Patent: Nov. 4, 1997

[54] CODING APPARATUS FOR BI-LEVEL IMAGES HALFTONED WITH ERROR DIFFUSION ALGORITHM

[75] Inventors: Satoshi Katsuno, Tokyo; Atsushi Koike; Yoshinori Hatori, both of Kanagawa, all of Japan

[73] Assignee: Kokusai Denshin Denwa Kabushiki Kaisha, Japan

[21] Appl. No.: 451,125

[22] Filed: May 26, 1995

[30] Foreign Application Priority Data

Jul. 20, 1994 [JP] Japan .................... 6-189015

[51] Int. Cl.⁶ ............................................ G06K 9/36
[52] U.S. Cl. ............................... 358/433; 358/432
[58] Field of Search .................... 358/433, 432, 358/458–459, 456, 465–466; 382/247, 252

[56] References Cited

U.S. PATENT DOCUMENTS

| | | | |
|---|---|---|---|
| 5,050,000 | 9/1991 | Ng .................... | 358/298 |
| 5,060,285 | 10/1991 | Dixit et al. .......... | 358/433 |
| 5,107,345 | 4/1992 | Lee .................... | 358/433 |
| 5,274,719 | 12/1993 | Taniguchi et al. ..... | 382/252 |
| 5,315,670 | 5/1994 | Shapiro ............... | 358/432 |
| 5,461,682 | 10/1995 | Nomura ............... | 358/432 |
| 5,555,323 | 9/1996 | Hongu ................ | 382/247 |
| 5,577,132 | 11/1996 | Yokose et al. ........ | 382/247 |

FOREIGN PATENT DOCUMENTS

| | | |
|---|---|---|
| 0 606 132 A2 | 7/1994 | European Pat. Off. . |
| 4-96574 | 3/1992 | Japan . |

OTHER PUBLICATIONS

"Perceptual Coding of Images for Halftone Display", by David L. Neuhoff and Thrasyvoulos N. Pappas, *IEEE Transactions On Image Processing*, vol. 3, No. 1, Jan. 1994, pp. 1–13.

"Information technology—Coded representation of picture and audio information—Progressive bi-level image compression", First Edition Dec. 15, 1993, *International Standard*, ISO/IEC 11544.

*Primary Examiner*—Edward L. Coles. Sr.
*Assistant Examiner*—Stephen Brinich
*Attorney, Agent, or Firm*—Westman, Champlin & Kelly, P.A.

[57] ABSTRACT

It is sought to provide a coding apparatus which permits high efficiency coding of bi-level images with black-and-white pixels halftoned with error diffusion algorithm. An image input/pixel selection unit selects, from an input image as a bi-level image with black-and-white pixels halftoned with error diffusion algorithm, first selected pixels with respect to a pixel "?" to be coded and second selected pixels as peripheral pixels with respect to the first selected pixels. The first selected pixels are fed to a pixel pattern binary scale translator for translation into a binary number. The second selected pixels, on the other hand, is fed to a pixel value adder for counting of black pixels. The count is fed to a binary scale translator for translation into a binary number. The binary number outputs of the pixel pattern binary scale translator and the binary scale translator are combined to be input to an address input terminal of a ROM having a coding information table.

4 Claims, 4 Drawing Sheets

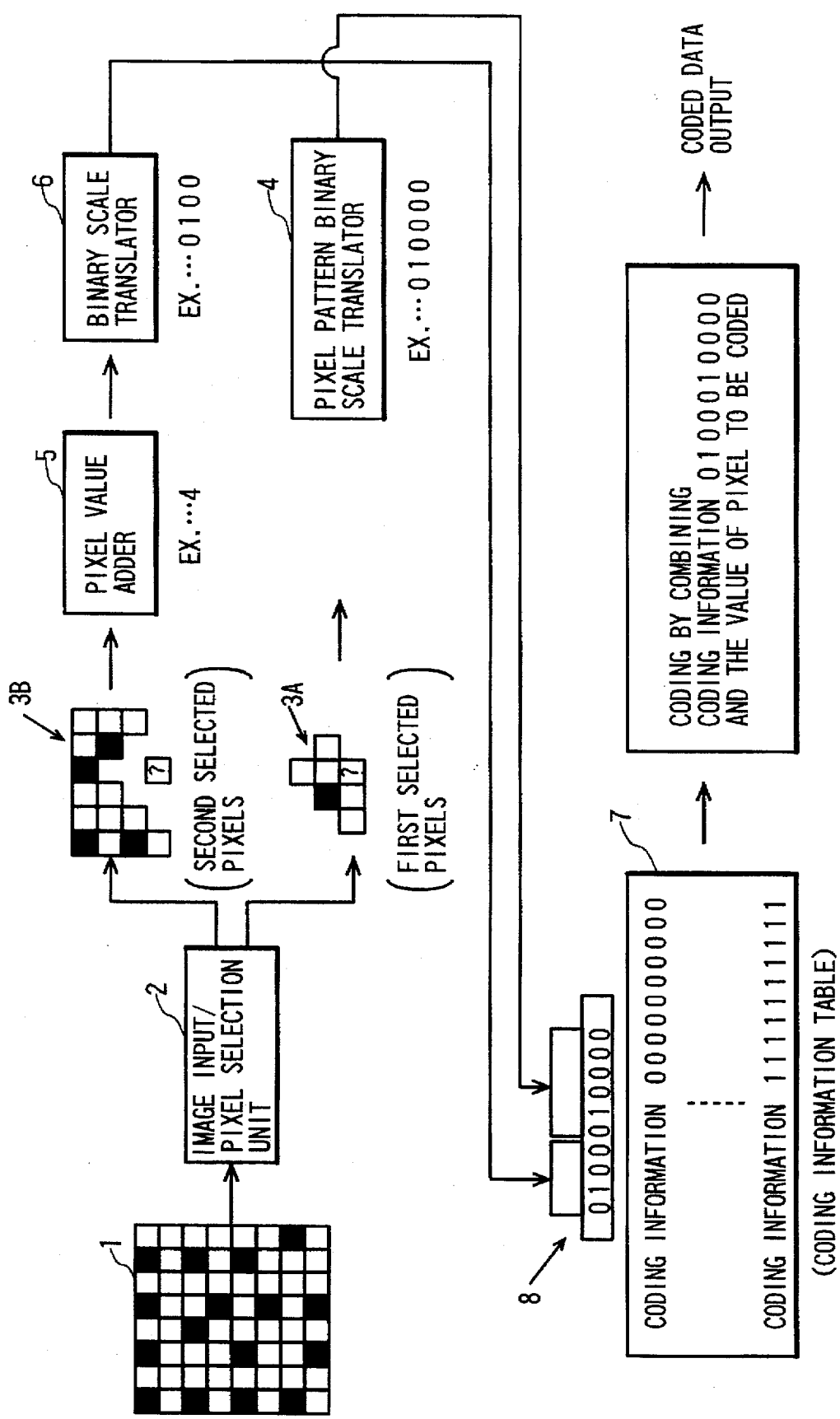

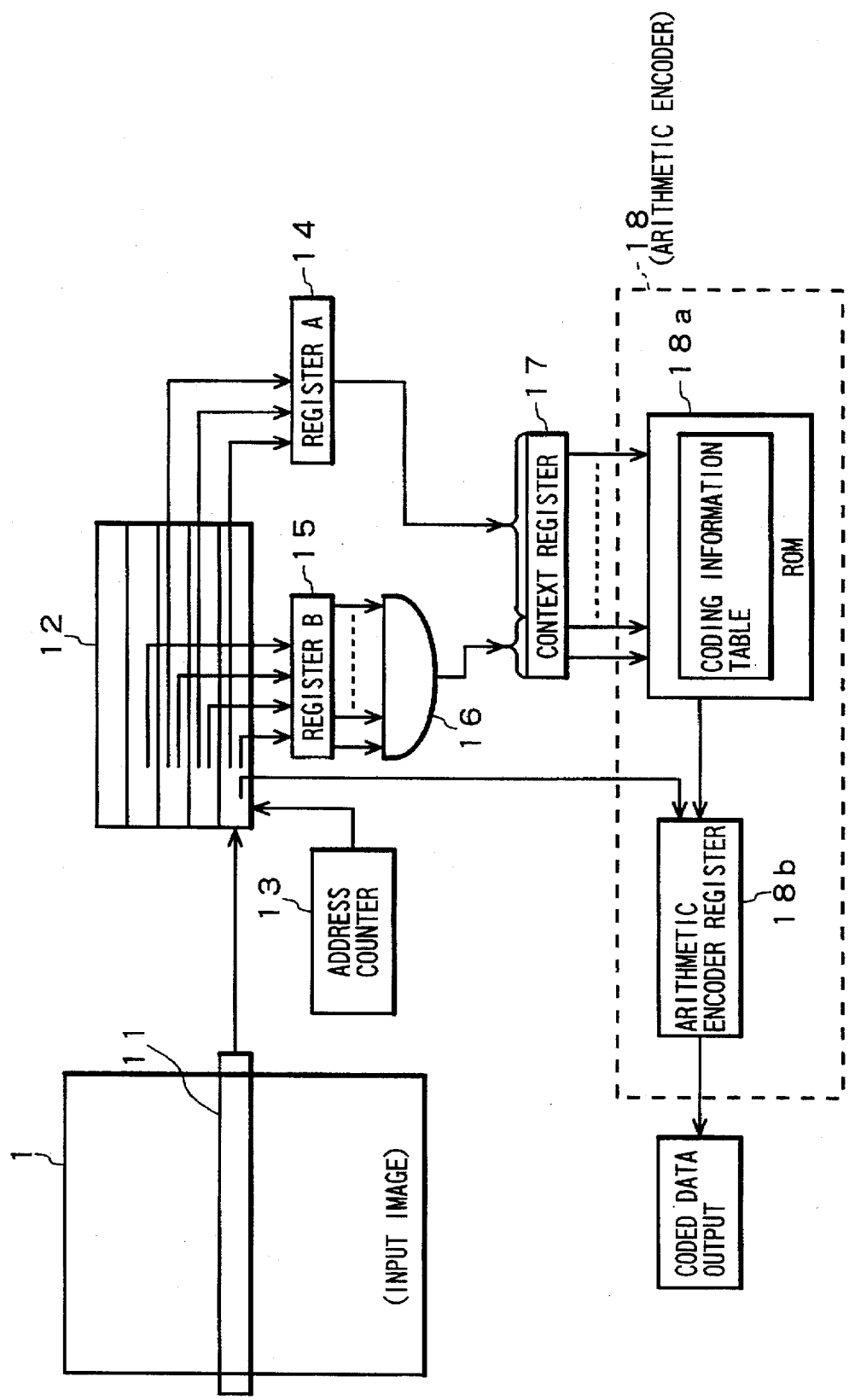

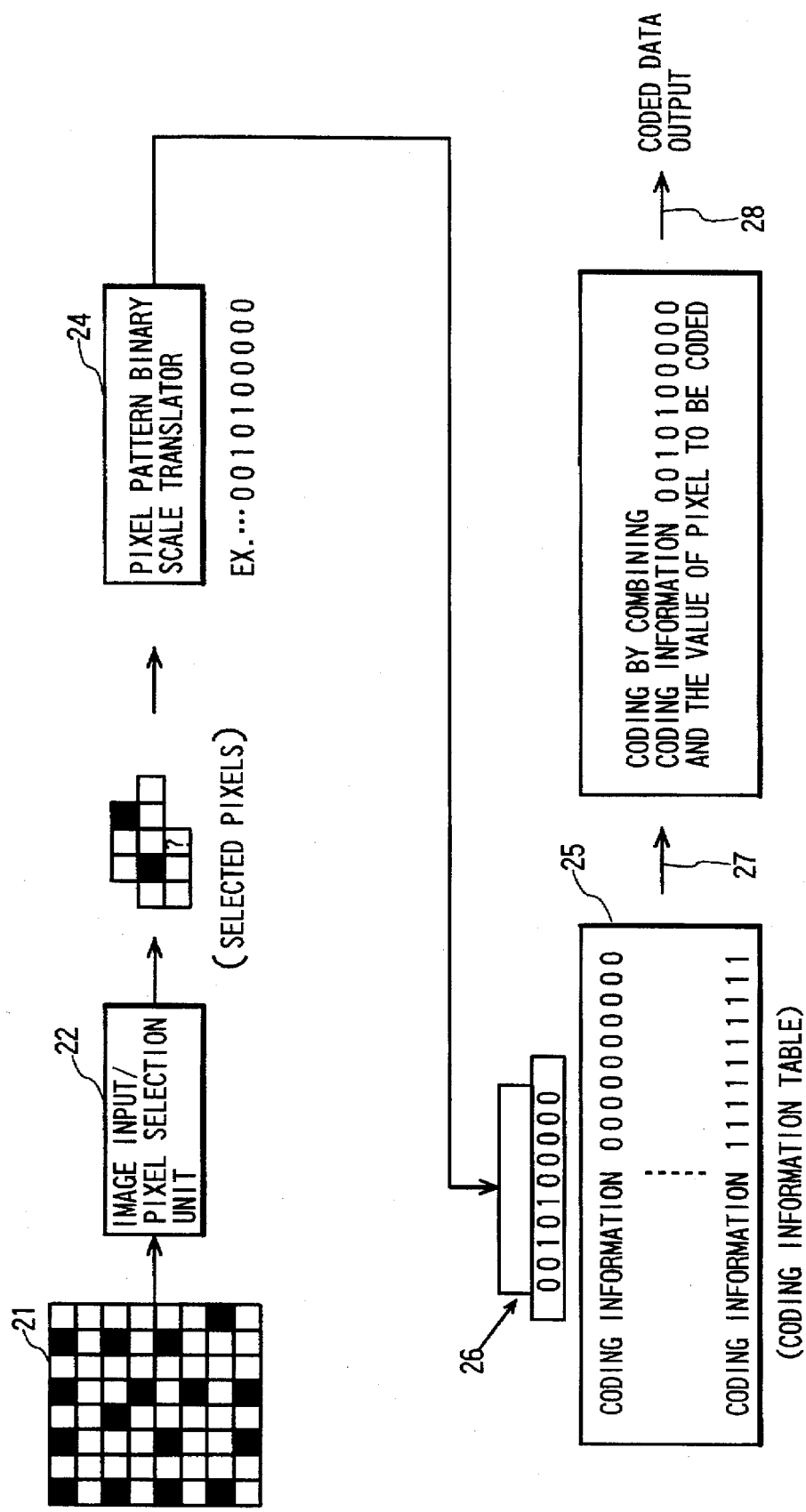

CODING APPARATUS FOR BI-LEVEL IMAGES HALFTONED WITH ERROR DIFFUSION ALGORITHM

BACKGROUND OF THE INVENTION

1. Field of the Invention

This invention relates to coding apparatus for bi-level images halftoned with error diffusion algorithm and, more particularly, coding apparatus for bi-level images halftoned with error diffusion algorithm which permit efficient coding of bi-level images halftoned with error diffusion algorithm.

2. Description of the Prior Art

As a method of translating continuous-tone images into bi-level images, there is a dithering algorithm. With this algorithm, a halftoned image is produced by adding a periodic array of information as noise to the original image. Another algorithm of the translation is error diffusion algorithm. This algorithm seeks to avoid loss of information contained in continuous-tone images. More specifically, in this algorithm a halftoned image is produced with a non-periodic pattern by adding quantization error that is generated when producing bi-level image to peripheral pixels in a predetermined ratio. With the error diffusion algorithm, it is generally possible to obtain high quality hi-level images compared to the dithering algorithm.

As a prior art coding system for bi-level images with black-and-white pixels, there is JBIG system (or International Standard ITU-T T.82) as shown in FIG. 4. This coding system is briefly as follows. When a bi-level image 21 as shown is input, an image input/pixel selection unit 22 selects peripheral pixels with respect to a pixel "?" to be coded. For example, the unit 22 selects 10 bit peripheral pixels as shown and makes these pixels to be selected pixels 23. These selected pixels 23 are input to a pixel pattern binary translator 24 for translation into a binary number. In the illustrated case, the binary number that is obtained is of 10 bits, i.e., "0010100000". This binary number serves as address signal to a ROM which includes a coding information table 25, and it is input to an address input terminal of the ROM. As a result, the ROM outputs coding information 27, for instance of 8 bits. This coding information 27 is then combined with the value of the pixel "?" to be coded. Thus, coded data 28 is produced.

It is well known in the art that the coding system as described above permits high efficiency coding when it is applied to bi-level images with black-and-white pixels obtained with the dithering algorithm. However, when the system is applied to high quality bi-level images obtained with the error diffusion algorithm, high coding efficiency can not be attained. The reason for this is as follows. With the dithering algorithm, a bi-level image with black-and-white pixels is halftoned by adding a periodic array of information as noise. This means that the same pattern of selected pixels 28 may appear highly frequently as the pixel "?" to be coded is updated for coding the whole image. On the other hand, the error diffusion algorithm in which bi-level images with black-and-white pixels are halftoned with non-periodic patterns, provides for low frequency or probability of appearance of the same pattern of selected pixels 28 with the updating of the pixel "?" to be coded.

SUMMARY OF THE INVENTION

An object of the invention is to provide a coding apparatus, which can preclude the above problem inherent in the prior art and permits high efficiency coding of bi-level images with black-and-white pixels obtained in the error diffusion algorithm.

To attain the above object of the invention, the invention features a coding apparatus for bi-level images halftoned with error diffusion algorithm permitting effective coding of bi-level images obtained with error diffusion algorithm, which comprises selected pixel extracting means for extracting first selected pixels as a plurality of peripheral pixels with respect to be coded and second selected pixels as a plurality of peripheral pixels with respect to the first selected pixels, counting means for counting like pixels among the second selected pixels, context generating means for generating a context from the output value of the counting means and the first selected pixels, and an arithmetic coding scheme for generating coding information from the context and generating coded data from the coding information from the context and the pixel to be coded.

According to the invention, the first selected pixels and the second selected pixels as counted by the counting means constitute a context. Thus, the bi-level image halftoned with error diffusion algorithm is coded with rounded non-periodicity by the arithmetic coding scheme, and it is possible to obtain increased coding efficiency.

BRIEF DESCRIPTION OF THE DRAWINGS

FIG. 1 is a view for illustrating and describing the principles underlying the invention;

FIG. 2 is a block diagram outlining the structure of an embodiment of the invention;

FIG. 4 is a view for illustrating and describing a prior art coding system.

DETAILED DESCRIPTION OF THE PREFERRED EMBODIMENT

Figure 3A:
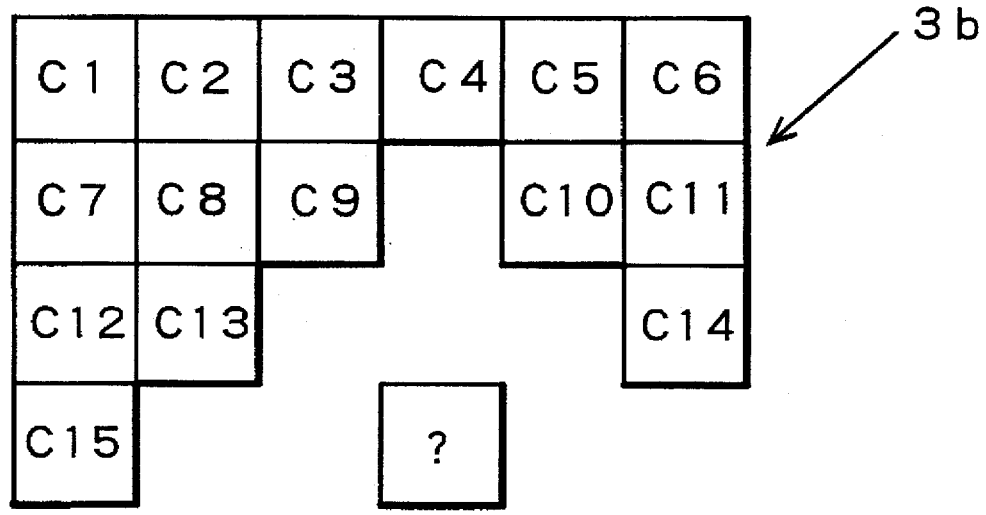
FIGS. 3A and 3B are views showing an example of first selected pixels and second selected pixels in the embodiment.

The invention will now be described in detail with reference to the drawings. First, the principles underlying the coding apparatus according to the invention will be described with reference to FIG. 1.

An image input/pixel selection unit 2 selectively outputs peripheral pixels, with respect to a pixel "?" to be coded, in an input image 1 which is a bi-level image with black-and-white pixels obtained in the error diffusion algorithm. According to the invention, the image input/pixel selection unit 2 selects first selected pixels 3a with respect to a pixel "?" to be coded and second selected pixels 3b which are peripheral pixels with respect to the first selected pixels 3a. The first selected pixels 3a are 6 bits, for instance, and the second selected pixels 3b are 15 bits, for instance.

The first selected pixels 3a are fed to a pixel pattern binary scale translator 4 for translation into the corresponding binary number. In the illustrated example, this binary number is "010000". The second selected pixels 3b, on the other hand, are fed to a pixel number adder 5. The pixel number adder 5 adds the number of like pixels, for instance black pixels, among the second selected pixels 3b. In the illustrated example, the added number is "4". The added number is fed to a binary scale translator 6 for translation into the corresponding binary number. In the illustrated example, this binary number is "0100". The binary number outputs of the pixel pattern binary scale translator 4 and binary scale translator 6 are combined into a binary number of 10 bits to be input to an address input terminal 8 of a ROM having a coding information table 7. The following operation is the same as in the prior art apparatus, so it is not described. The sum of the bits of the binary number outputs of the pixel pattern binary scale translator 4 and binary scale translator 6 is set to 10 bits for the sole reason that with most of commercially available ROMs the address input terminal 8 has 10 bits, and it is of course that the sum is not limited to 10 bits.

Now, an embodiment of the invention will be described with reference to the block diagram of FIG. 2. Referring to the Figure, designated at numeral 11 is an input image scanner for reading out input image 1 which is a bi-level image with black-and-white pixels halftoned with the error diffusion algorithm, at numeral 12 a line memory having a capacity of several lines, and at numeral 13 an address counter for designating predetermined addresses of the line memory 12, i.e., the addresses of the first and second selected pixels 3a and 3b. Designated at numeral 14 is a first register for tentatively storing the first selected pixels 3a read out from the line memory 12, at numeral 15 a second register for tentatively storing the second selected pixels 3b read out from the line memory 12, at numeral 16 an adder for adding the output of the second register 15 to output a corresponding binary code, and at numeral 17 a context register for storing the output of the adder 16 as upper bits and the output of the first register 14 as lower bits. In the context, the value ("0" or "1") of each pixel to be coded is made to correspond to each bit ("0" or "1").

Designated at numeral 18 is an arithmetic encoder having a ROM 18a having the coding information table noted above and an arithmetic encoder register 18b. The arithmetic encoder 18 receives the value of pixel to be coded from the line memory 12 and also receives the context value from the context register 17 and derives a pixel value appearance probability corresponding the context value from the coding information table. It produces encoded data through operations on the value of the pixel to be coded and the pixel value appearance probability in the arithmetic encoder register 18b. The arithmetic encoder 18 is well known in the art, so it is not described in detail.

Figure 3B:
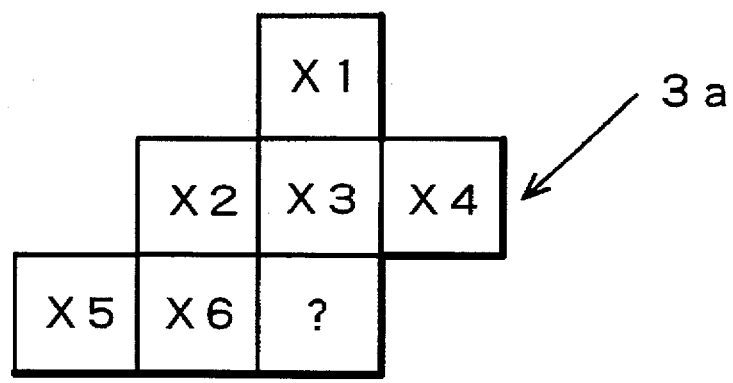

Denoting, as shown in FIG. 3, the individual second selected pixels 3b by C1 to C15 and the individual first selected pixels 3a by X1 to X6, data CX given by an equation $$CX = \sum_{i=1}^{6} 2^{i-1} X_i + 2^6 \sum_{j=1}^{15} C_j \quad (1)$$

is stored in the context register 17.

The operation of the embodiment of the invention will be described with reference to FIG. 2. The input image 1, i.e., bi-level image with black-and-white pixels obtained by the error diffusion algorithm, is read out and converted into a bi-level electric signal of "1" and "0" by the input image scanner 11. This bi-level signal is successively input to the line memory 12. The address counter 13 designates the addresses of the pixel "?" to be coded and the corresponding first and second selected pixels 3a and 3b. When the pixel "?" to be coded is shifted, the address counter 13 designates the addresses of the first and second selected pixels 3a and 3b with respect to the pixel "?" to be coded after the shift.

As a result, the first selected pixels 3a in the addresses designated by the address counter 13 are input to the first register 14. Meanwhile, the second selected pixels 3b in the addresses designated by the address counter 13 are input to the second register 15. The adder 16 counts the black pixels in the second register 15 and outputs the resultant count as a binary code. This count is stored as upper bits in the context register 17, while the data in the first register 14 is stored as lower bits in the context register 17.

Subsequently, the data in the contact register 17 is fed to the arithmetic encoder 18. This data is input to the address terminal of the ROM 18a in the arithmetic encoder 18. Thus, corresponding coding information is read out from the ROM 18a and fed to the arithmetic encoder register 18b. The arithmetic encoder register 18b generates and outputs coded data through operation on the value of the pixel to be coded from the line memory 12 and the coding information from the ROM 18a using a predetermined operation formula.

As has been shown, in this embodiment the data stored in the context register 17 consists of the sum of the number of the first selected pixels 3a and the number of black pixels among the second selected pixels 3b. Thus, it is possible to obtain high efficiency coding of the input image which is a bi-level image with black-and-white pixels halftoned with the error diffusion algorithm.

The reason for this is as follows. The bi-level image with black-and-white pixels halftoned with the error diffusion algorithm consists of non-periodic image data, and coding of this image in the prior art system does not provide for so much efficiency increase as compared to the coding of hi-level images with black-and-white pixels halftoned with the dithering algorithm. In this embodiment, however, the second selected pixels 3b are subjected to the addition process as described above. This has an effect of rounding or weakening the non-periodic property of the pattern of the second selected pixels 3b. More specifically, even if the set of the second selected pixels 3b constitutes a different pixel pattern, it is not regarded to be different so long as the total number of black pixels is the same, and thus the non-periodicity is rounded or weakened. Thus, the frequency that the data stored in the context register 17 is of the same pattern is increased. This permits coding efficiency improvement when a hi-level image with black-and-white pixels halftoned the error diffusion algorithm is coded as input image by using the prior art arithmetic encoder. Further, since the coded image is obtained from the bi-level image with black-and-white pixels halftoned with the error diffusion algorithm, it is possible to ensure satisfactory image quality.

Bi-level images with black-and-white pixels prepared with the error diffusion algorithm were coded in accordance with this embodiment to obtain coding efficiency improvement of about 7% in the average and 16% in the maximum in comparison to the case of the prior art system shown in FIG. 4.

The coding system according to the invention is greatly effective when it is applied to, for instance, a facsimile apparatus having binary scale translator means based on the error diffusion algorithm.

The reason why it is possible to permit such coding efficiency improvement according to the invention can be explained from the character viewpoint as follows.

In the prior art JBIG system, the peripheral pixel pattern is used directly as prediction model as described before in connection with FIG. 4. With images based on the error diffusion algorithm, it is difficult to accurately approximate the appearance probability of pixel value through prediction from the peripheral pixel pattern to be "0" or "1" because the peripheral pixel pattern is non-periodic as noted above. It is thus impossible to attain as high coding efficiency as with images based on the dithering algorithm.

According to the invention, however, use is made of the fact that the pixel pattern is varied according to the grey level of the original continuous-tone image. Generally, with pixels generated on the basis of the error diffusion algorithm, by making grey expression through selection of adjacent pixels to the pixel to be coded from a bi-level image it is possible to obtain values considerably close to grey levels of the original continuous-tone image. Accordingly, to estimate a grey level of the initial continuous-tone image from peripheral pixels, a value as the sum of values of adequately selected peripheral pixels is used. By performing the estimation for individual grey levels, it is possible to obtain accurate approximation of the pixel value appearance probability. It is thus possible to permit coding efficiency improvement by using independent contexts for the respective grey levels.

What is claimed is:

1. A coding apparatus for bi-level images halftoned with error diffusion algorithm permitting effective coding of bi-level images obtained with error diffusion algorithm, comprising:

selected pixel extracting means for extracting first selected pixels as a plurality of peripheral pixels with respect to a pixel to be coded and second selected pixels as a plurality of peripheral pixels with respect to the first selected pixels;

counting means for counting like pixels among the second selected pixels;

context generating means for generating a context from the output value of the counting means and the first selected pixels; and an arithmetic coding scheme for generating coding information from the context and generating coded data from the coding information and the pixel to be coded.

2. The coding apparatus for bi-level images halftoned with error diffusion algorithm according to claim 1, wherein:

the selected pixel extracting means includes accumulating means for accumulating several lines of an input image, means for designating read addresses corresponding to the first and second selected pixels, and means for tentatively storing the first and second selected pixels read out from the accumulating means.

3. The coding apparatus for bi-level images halftoned with black-and-white pixels according to claim 1, wherein:

the like pixels counted by the counting means are black pixels.

4. The coding apparatus for bi-level images halftoned with black-and-white pixels according to claim 1, wherein:

denoting the first selected pixels by Xi when i is 1 or a greater integer m, and the second selected pixels by Cj when j is 1 or a greater integer n, the context CX is given as $$CX = \sum_{i=1}^{m} 2^{i-1} X_i + 2^m \sum_{j=1}^{n} C_j. \quad (2)$$

* * * * *